United States Patent [19]
Phillips

[11] Patent Number: 5,506,743
[45] Date of Patent: Apr. 9, 1996

[54] SOLID STATE OVERLOAD RELAY WITH PHASE UNBALANCE PROTECTION HAVING RMS CURRENT APPROXIMATION

[75] Inventor: Timothy B. Phillips, Raleigh, N.C.

[73] Assignee: Square D Company, Palatine, Ill.

[21] Appl. No.: 134,767

[22] Filed: Oct. 8, 1993

[51] Int. Cl.$^6$ .................................................. H02H 3/18
[52] U.S. Cl. ................................................ 361/85; 361/87
[58] Field of Search ................................. 361/78, 79, 82, 361/83, 85, 87, 93, 94, 18

[56] References Cited

U.S. PATENT DOCUMENTS

| | | | |
|---|---|---|---|
| 3,573,604 | 4/1971 | Lundgreen | 361/18 |
| 4,345,288 | 8/1982 | Kampf et al. | 361/85 |
| 4,658,323 | 4/1987 | Dougherty | 361/79 |

Primary Examiner—A. D. Pellinen
Assistant Examiner—Ronald W. Leja
Attorney, Agent, or Firm—Larry I. Golden; David Russell Stacey; Larry T. Shrout

[57] ABSTRACT

A solid state overload relay utilizes an apparatus that converts the current of a polyphase electrical load to a voltage signal approximately proportional to the RMS current of the load. In addition to providing the overload function, the voltage signal is used to provide an improved phase current unbalance protection. Conventional current transformers sense the current flow in each phase of the load. The current waveform for each phase is converted to a voltage by rectification and the peak value and the average value of the resultant voltage is determined. A summing circuit combines the two values at a predetermined ratio to create a DC voltage that is approximately equal to the rms value of the input phase current. A combination of the approximation circuit with a time integrating circuit and a level detecting circuit produces a low cost solid state overload relay in one embodiment of the invention. The phase current unbalance circuit determines the average of the DC voltages from each phase and compares this average with the DC voltage from each individual phase. It will output a trip signal if any of the individual phase currents exceeds the average by a predetermined percentage of the average for a set time interval. The improved device does not require compensation for non-sinusoidal currents, line harmonics, or transients which could cause erroneous results.

19 Claims, 8 Drawing Sheets

5,506,743

SOLID STATE OVERLOAD RELAY WITH PHASE UNBALANCE PROTECTION HAVING RMS CURRENT APPROXIMATION

TECHNICAL FIELD

Applicant's invention relates generally to polyphase solid state overload relays for protecting a load, and more particularly to a solid state overload relay with a phase unbalance circuit based on a comparison of signals proportional to the RMS current of each phase of the load.

1. Related Application

This application is related to the following, commonly assigned application filed on Aug. 11, 1993, entitled "Method and Apparatus for RMS Current Approximation" (application Ser. No. 08/104,747, Our Docket RLC-2). The contents of this application are expressly incorporated herein by reference.

2. Background Art

Many methods have been utilized to determine phase unbalance between phase currents of a polyphase load. These methods are part of more complex systems for use with solid state breakers or overload relays, AC line monitoring devices, or current feedback control loops as required for motor drives and power supplies. Phase current unbalance is defined by the equation:

$$\text{PERCENT CURRENT UNBALANCE} = \frac{\text{MAX. CURRENT DIFFERENCE FROM AVE. CURRENT}}{\text{AVE. CURRENT}}$$

The application usually determines the degree of measurement accuracy required. For simple systems, this may not be necessary and instead, average current over a set time period, usually one cycle, is used to represent the actual current. Other systems will use peak current over the same time period as the basis. Root-mean-square (rms) current is generally considered as a more accurate representation of the actual current flowing in the circuit being monitored. Other systems will use peak current over the same time period as the basis. More sophisticated microprocessor based devices will actually compute the rms value by sampling the current waveforms many times during each time period, and using those sample measurements to generate the value of the current over the time period.

For a solid state overload relay, a common method used for phase loss protection is to compare each phase current with a signal representative of the average line current as derived from a peak detecting circuit as disclosed in commonly assigned U.S. Pat. No. 4,345,288. Although this device provides a close approximation of the average current, the device does not compensate for non-sinusoidal currents that may be encountered in some instances. Likewise, line harmonics and transients may cause erroneous results. If the application is for a solid state reduced voltage starter with power factor control, the current waveform during starting and under light load conditions could appear as full wave rectified single phase current which would result in nuisance tripping. Additionally, the previous art schemes are insensitive to a phase loss on the primary side of a star-delta or delta-star transformer since, under these conditions, none of the secondary currents will go to zero as would be required for the prior art methods.

A microprocessor based device to accomplish a similar function is outlined in U.S. Pat. No. 5,220,478 which computes the rms current through digital sampling techniques. Whereas this is a more accurate method, it is a relatively expensive solution because of the increased component requirements for support circuitry and the increase in the size of the device to house the extra components. U.S. Pat. No. 5,038,246 also describes a phase unbalance algorithm for use with a microprocessor based device. For a low cost application where size is also a factor, it would be desirable to provide a solid state overload relay that computes an approximation of the rms current for each phase and for use in computing the average of the three phase currents without the complexity of a microprocessor based device.

SUMMARY OF THE INVENTION

Accordingly, the principal object of the present invention is to provide an overload relay utilizing a method and apparatus that converts the current of a polyphase electrical load to a signal proportional to the rms current of the load.

A further objective of the invention is to provide an overload relay function with improved phase current unbalance protection utilizing the method and apparatus that converts the current of a polyphase electrical load to a signal proportional to the rms current of the load.

In the preferred embodiment of the invention, conventional current transformers sense the current flow in each phase of the load. The load typically could be a three phase motor. The current transformers generate an output current signal that is proportional in magnitude to the sensed phase current. This output is coupled to a current to voltage converter circuit to create a voltage that is also proportional in magnitude to the sensed current. This voltage signal is applied to two circuits connected in parallel, one to measure the peak value of the voltage and the other to measure the average value of the voltage over one cycle of the applied AC voltage. The outputs of both of these circuits are connected together at a summing junction through different valued resistors of a buffer amplifier. These different resistance values at the input to the summing point serve as to provide different weighting factors to the two signals to produce a composite voltage signal. This signal will be a DC level, which for a sinusodial current, closely approximates a scaled rms value of the original input load current. For the common non-sinusoidal current waveforms encountered in most applications, this circuit will retain its accuracy to within a ±5% of the true rms value.

For an overload relay function, this output of the current to voltage converter circuit for each of the three phases is summed to create a composite signal proportional to the average of the rms currents. This signal is fed to a time integrating circuit to produce various trip curves, the output of which is compared with a predetermined trip reference voltage signal. When this output exceeds this level, the overload relay will trip, providing an output contact or contacts that will change state when this does occur.

For the phase unbalance circuitry this composite signal is independently compared with the output of the current to voltage converter circuit for each of the three phases. If any of these comparisons exceeds a preset percentage of the average for a predetermined time interval, the overload relay will also trip.

Other features and advantages of the invention, which are believed to be novel and nonobvious, will be apparent from the following specification taken in conjunction with the accompanying drawings in which there is shown a preferred embodiment of the invention. Reference is made to the

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
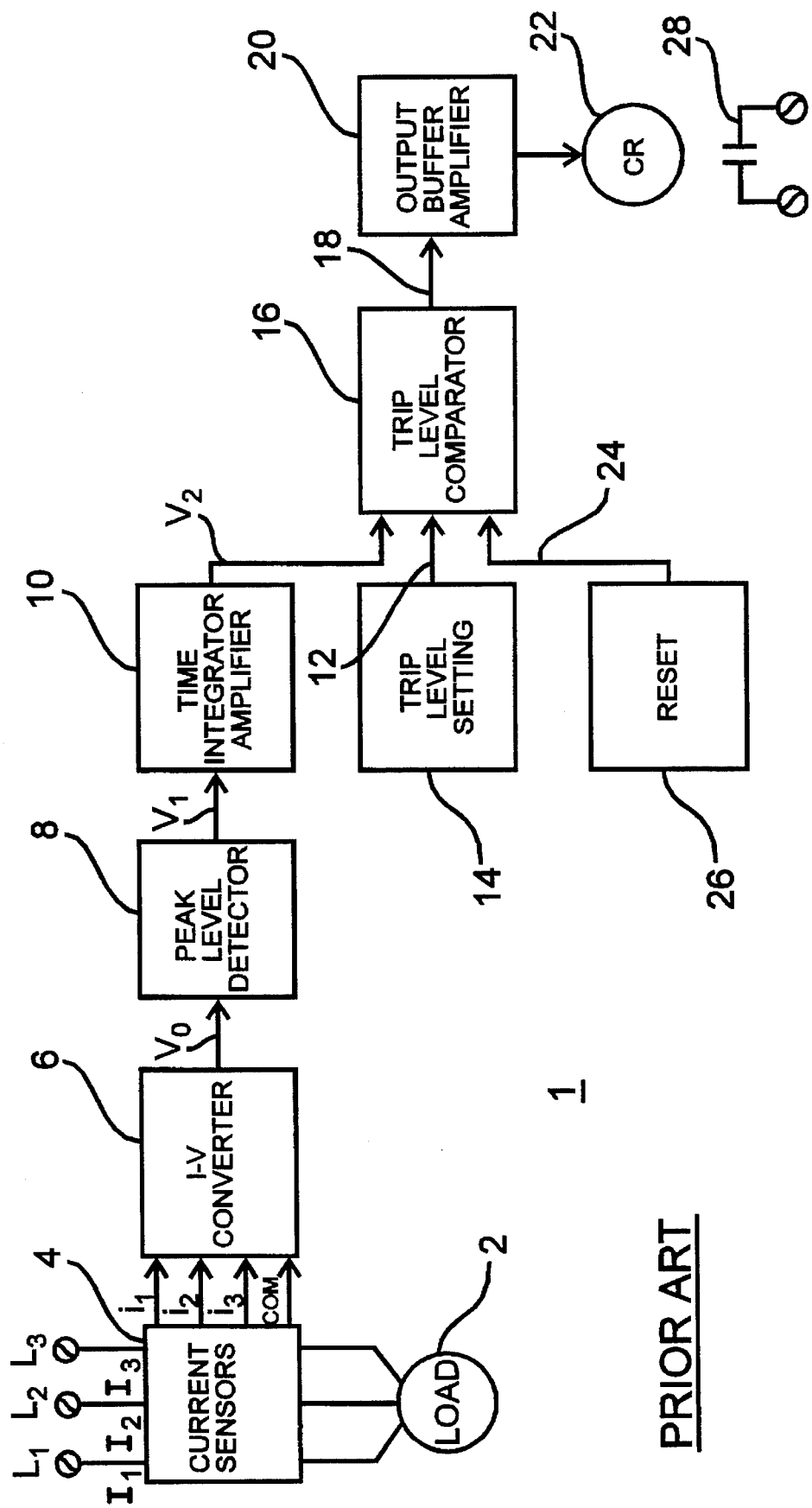
FIG. 1 is a diagram of a typical prior art solid state overload relay (SSOLR).

FIG. 1 illustrates a typical solid state overload relay protective device 1 representative of prior art. A circuit breaker function would be similar. Three phase incoming power L1–L3 is fed to a load 2. The load could be lighting equipment, heating equipment or inductive loads such as motors, magnets, brakes or coils. Current sensors 4 monitor the load currents I1–I3 to create currents i1–i3 respectively which are proportional in magnitude to the sensed currents. The current sensors 4 generally are current transformers. A current to voltage converter 6 transforms the three currents i1–i3 to an output voltage Vo that is proportional to a composite of the sum of the three currents. The resulting voltage Vo is mostly DC with about a 10% ripple for balanced sinusoidal currents. A peak detecting circuit 8, typically consisting of a diode and a capacitor, will capture the peaks of the ripple voltage Vo to generate a voltage V1 which will be a DC voltage that is proportional to the peak current of the load 2. The overload relay function is time based and not instantaneous. The greater the magnitude of the overload, the faster the overload relay must trip out. Therefore, time integrator amplifier 10 will integrate voltage V1 to create a voltage V2 which has an inverse time relationship with the magnitude of the sensed currents I1–I3. Voltage V2 is an exponential response to the input voltage V1. When an overload condition arises, V2 will start ramping up above a level that represents the 100% current rating of the overload relay. To create the overload trip curve, a voltage 12, as set by trip level setting circuit 14 is computed such that the output of the time integrator amplifier 10 will reach this voltage level 12 if the overload condition exists for a predetermined amount of time. For instance, if the overload condition is at 600% of the rated load, this time might be set at 10 seconds and be set at 200 seconds if the overload is at 200% of the load. Trip level comparator 16 will compare voltage V2 with this predetermined voltage 12 and will output a signal 18 that will energize control relay 22 through output amplifier 20 once voltage V2 exceeds set level voltage 12. Comparator 16 will function as a Schmidt trigger in that once this comparison has been exceeded, the output 18 will remain in the tripped state until output V2 has decayed below a second predetermined reset level 24 and the reset 26 is activated, either manually or automatically. Contacts 28 from relay 22 are used to disconnect the power L1–L3 from the load, the details of which are well known, when the overload relay has tripped.

Figure 2:
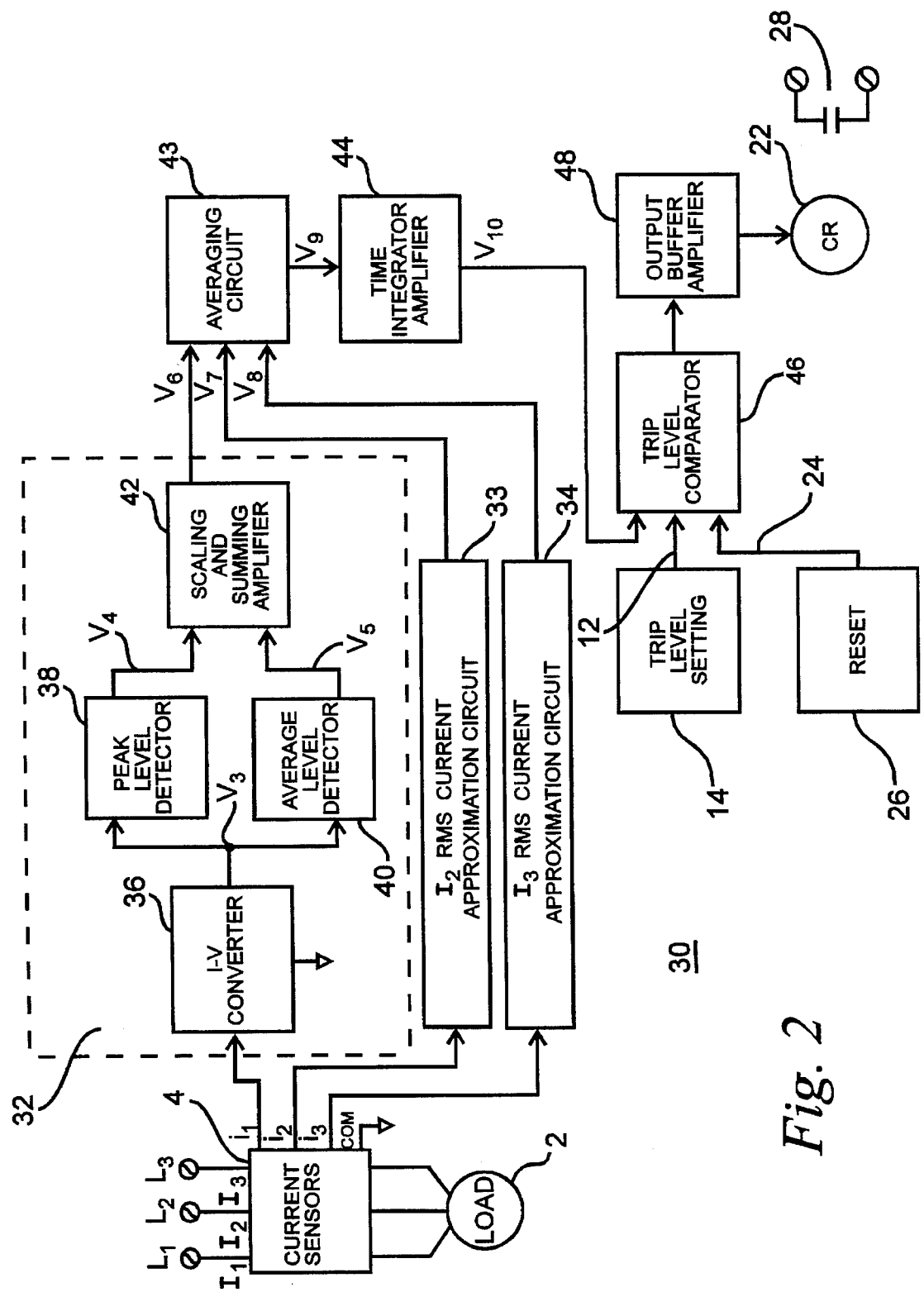
FIG. 2 is a schematic block diagram of a SSOLR utilizing a system for converting the load current to an approximation of the rms value of the current as disclosed in U.S. patent application Ser. No. 08/104,747.

Referring to FIG. 2, an improved solid state overload relay 30 utilizing a system for converting the three phase load current I1–I3 to an approximation of the rms value of the currents as disclosed in U.S. patent application Ser. No. 08/104,747 is detailed. As discussed above, three phase incoming power L1–L3 is fed to a load 2. Current sensors 4 monitor the load currents I1–I3 to create the proportional currents i1–i3, respectively. Each of the currents i1–i3 is independently processed by an rms current approximation circuit 32–34, the object of the present invention. Current i1 is converted to a voltage V3 by an I–V converter 36. V3, which is proportional to the load current I1, is divided into two paths, one to a peak level detecting circuit 38 and the other to an average level measuring circuit 40. Peak level detecting circuit 38 will capture the peaks of the ripple voltage V3, generating a voltage level V4, Average level measuring circuit 40 generates a voltage V5 which will be a DC voltage that is proportional to the average current of the load 2. V4 and V5 are inputted to scaling and summing amplifier 42 which generates a voltage V6 which is a proportional rms approximation of the sensed line current I1.

It has been empirically determined that an accurate approximation of the line current can be attained based on the equation:

$$I_{rms}=0.22*I_{pk}+0.766*I_{ave}$$

where $I_{rms}$ is the root mean square current, $I_{pk}$ is the peak value of current, and $I_{ave}$ is the average value of current. Scaling and summing amplifier 42 solves this equation to create the DC output voltage V6 which is proportional to rms value of the line currents I1–I3. For most non-sinusoidal currents, a ±5% accuracy for the approximation can be attained. This compares with a 30% accuracy common for traditional systems based on a peak detecting method.

Likewise, rms current approximation circuits 33 and 34, which are identical with circuit 32, will generate output voltages V7 and V8. The output voltages V6–V8 are fed to an averaging circuit 43 which will combine them to create a composite DC voltage V9 which is proportional to the average of the three rms phase currents I1–I2, and I3. V9 is inputted to time integrator circuit 44 which, along with the trip level comparator 46, and output buffer amplifier 48 provides the timing function and output relay contacts as previously discussed for the overload relay function and is identical with the system disclosed above.

Figure 3:
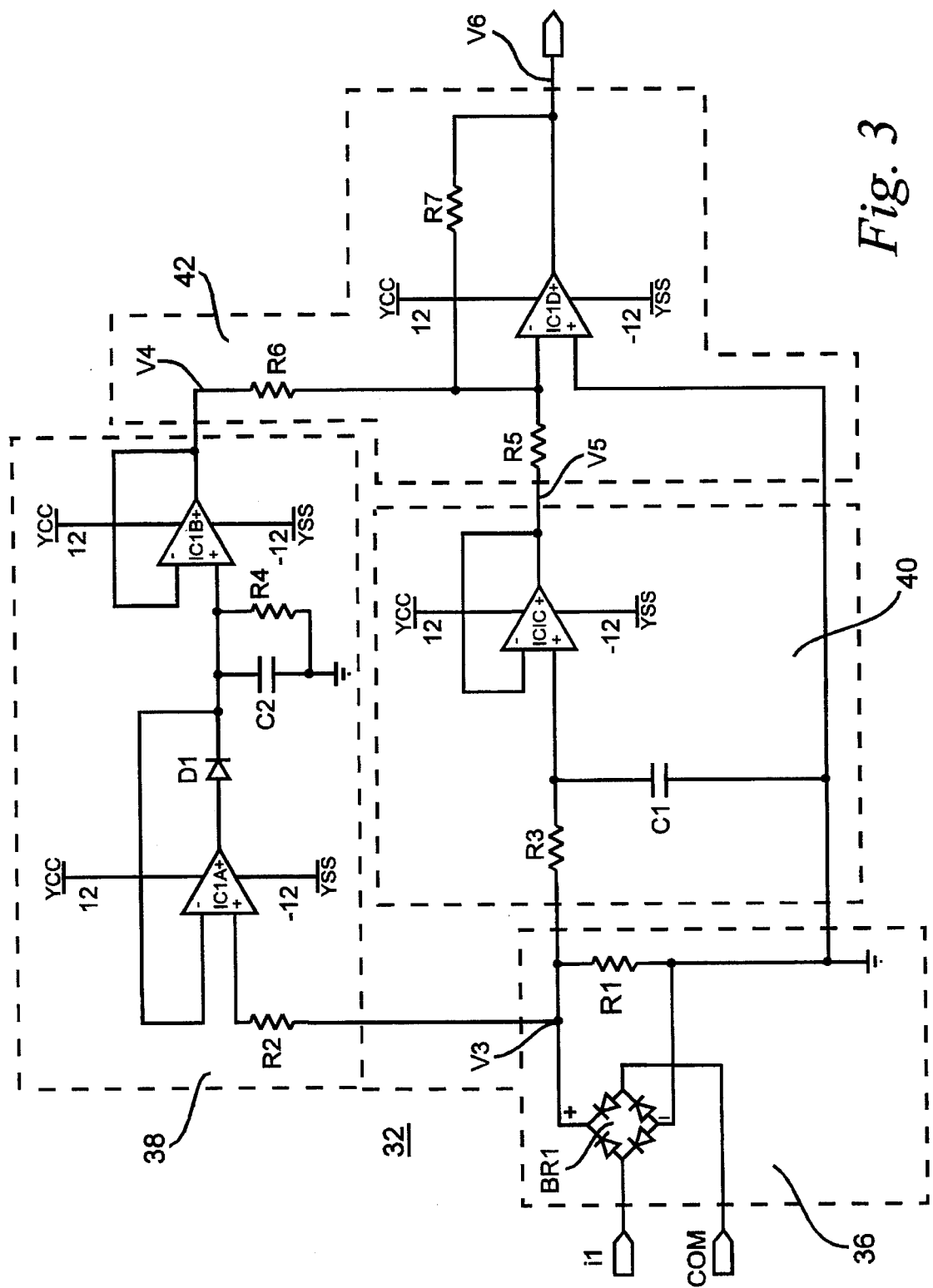
FIG. 3 is a detailed schematic block diagram of the approximation circuit as depicted in FIG. 2.

For the preferred embodiment of the present invention, FIG. 3 details the approximation circuit 32 as depicted in FIG. 2 which comprises the current to voltage converter 36, the peak level detecting circuit 38, the average level measuring circuit 40, and the scaling and summing amplifier 42. As previously mentioned, approximation circuits 33–34 are identical to circuit 32. Load currents I1–I3 are monitored by current transformers in each of the three phase conductors. The secondaries of the current transformers produce currents i1, i2, and i3. Currents i1–i3 are reduced in magnitude based on the turns ratio of the current transformers. Each phase current is measured separately by the current to voltage converter circuit 36 in each of the approximation circuits 32–34. Bridge rectifier BR1 produces a full wave rectified current from i1 to generate a full wave rectified voltage V3 across burden resistor R1. Voltage V3 is divided into two paths, one to peak level detecting circuit 38 through resistor R2 and the other to average level measuring circuit 40 through resistor R3.

The peak detecting circuit 38 consists of a first op amp IC1A, which together with diode D1 combine to form an ideal diode combination and capacitor C2. The ideal diode combination eliminates a voltage drop normally associated with a standard diode which would result in errors in the output voltage V4. Resistor R4 connected in parallel with C2 provides a discharge path with a long time constant to avoid the circuit from becoming just a sample and hold circuit. C2 has low resistance in its charging path and high resistance in its discharge path so that the voltage across C2 will essentially be proportionally equal to the peak value of the input voltage V3. Op amp IC1B provides a buffer for output V4 to avoid the input impedance of the next stage from causing an error in the C2 voltage. The output V4 of buffer amp IC1B thus represents this peak voltage.

A series connected resistor R3 and capacitor C1 combine to form the average level measuring circuit 40. The voltage across C1 will be proportional to the average of the voltage V3. R3 and C1 are scaled to provide this function over the frequency range from 48 Hz to at least 780 Hz. Op amp IC1C provides a buffer for output V5 to avoid the input impedance of the next stage from causing an error in the C1 voltage. The output V5 of buffer amp IC1C thus represents the average of the V3 voltage.

Scaling and summing amplifier circuit 42 receives voltages V4 and V5 at a summing junction of op amp IC1D through resistors R6 and R5 respectively. The values of these resistors along with feedback resistor R7 are calculated such that the output V6 of the summer amplifier IC1D will be proportional to fractions of the each input V4, V5, so as to solve the equation $I_{rms} - 0.22*I_{pk} + 0.766*I_{ave}$. Output voltage V6 is a DC voltage which has been empirically determined to be proportional to the rms value of the line currents L1–L3 for sinusoidal currents and having, for most non-sinusoidal currents, an accuracy that is within 5% of the true rms value. Voltage V6 is coupled to the averaging circuit 43 where it is combined with the equivalent voltages V7 and V8 generated by the other two phases to generate the output voltage V9 which is proportional to the average of the three rms phase currents I1–I3. The op amp circuits IC1A–D are supplied from a dual rail ±12 VDC power supply, not shown, but the details of which are well known.

Figure 4:
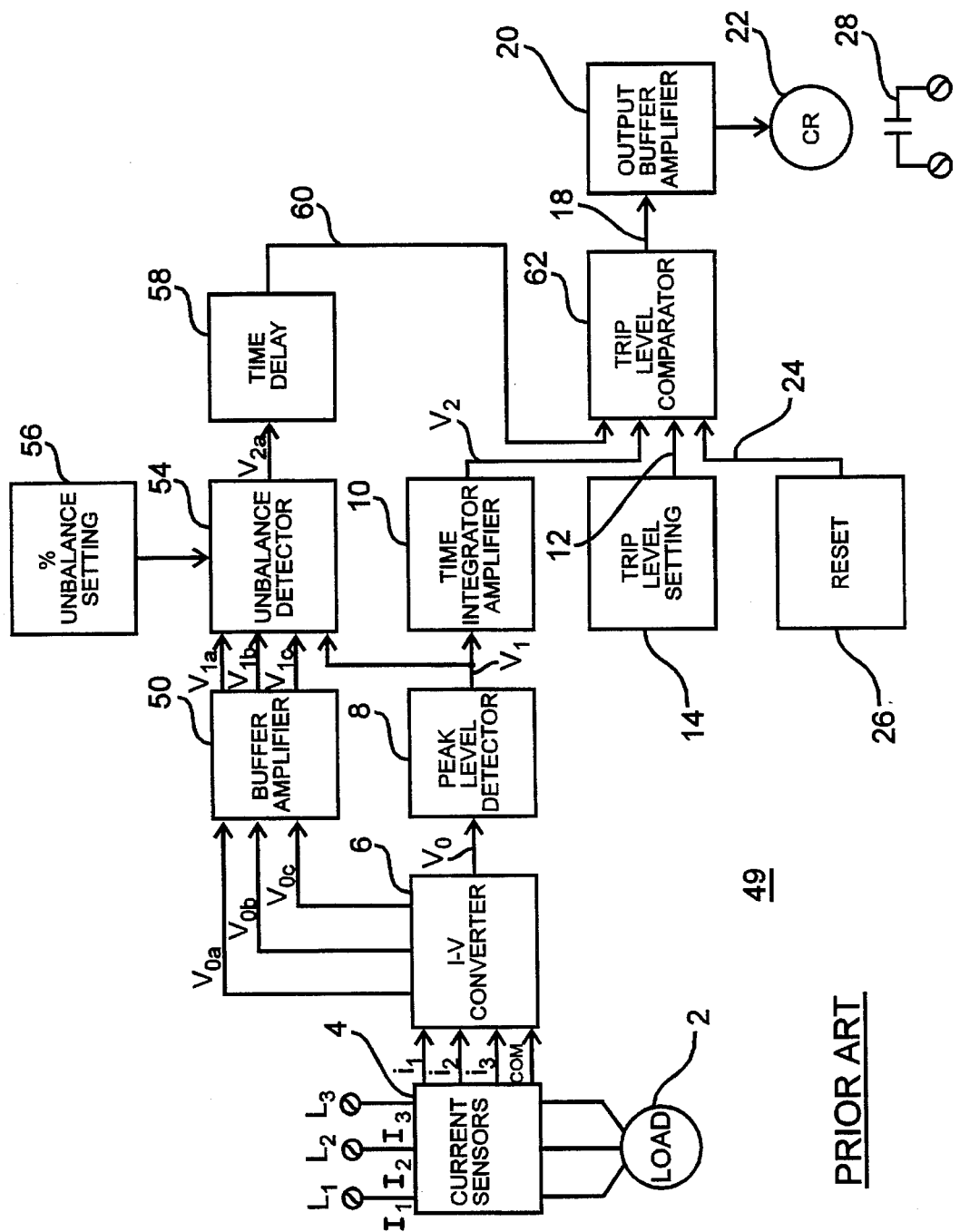
FIG. 4 is a block diagram of a prior art SSOLR with current phase unbalance protection.

FIG. 4 illustrates a prior art SSOLR 49 with an additional feature of current phase unbalance protection. As in FIG. 1, three phase incoming power L1–L3 is fed to a load 2. Current sensors 4 monitor the load currents I1–I3 to create currents i1–i3 respectively which are proportional in magnitude to the sensed currents. A current to voltage converter 60 transforms the three currents i1–i3 to an output voltage Vo that is proportional to a composite of the sum of the three currents. Additional outputs V0a, V0b, and V0c are also generated that are individually proportional to the three currents I1–I3, respectively. Buffer amplifier 50 will scale outputs V0a, V0b, and V0c using averaging or peak level detecting circuits to create outputs V1a, V1b, and V1c that will remain proportional to the three currents I1–I3, respectively. The peak detecting circuit 8, as before, generates voltage V1 which is proportional to the peak current of the load 2. Besides inputting to time integrator amplifier 10 for the overload function to create voltage V2, it is fed to unbalance detector circuit 54 for comparison with V1a, V1b, and V1c. Percent unbalance setting circuit 56 establishes the level of unbalance that is acceptable. If any of the scaled voltages V1a, V1b, or V1c exceed the peak current composite voltage V1 by the amount as set by circuit 56, output V2a will activate time delay circuit 58 which may have a fixed or adjustable time interval over which the phase unbalance is acceptable before outputting the trip signal 60. This time delay is to eliminate nuisance tripping due to transients or short term unbalances caused by temporary outside forces such as other motors starting or inrush currents of other loads connected to the same voltage source. Trip level comparator 62 will compare voltage V2 from the overload circuits and voltage 60 from the unbalance circuit with a predetermined voltage 12 and will output a signal 18 that will energize control relay 22 through output amplifier 20 once voltage V2 exceeds set predetermined voltage 12. Although this system functions adequately, it does not compensate for nonsinusoidal currents that may be encountered in normal operation. Line harmonics and transients may cause erroneous results.

Figure 5:
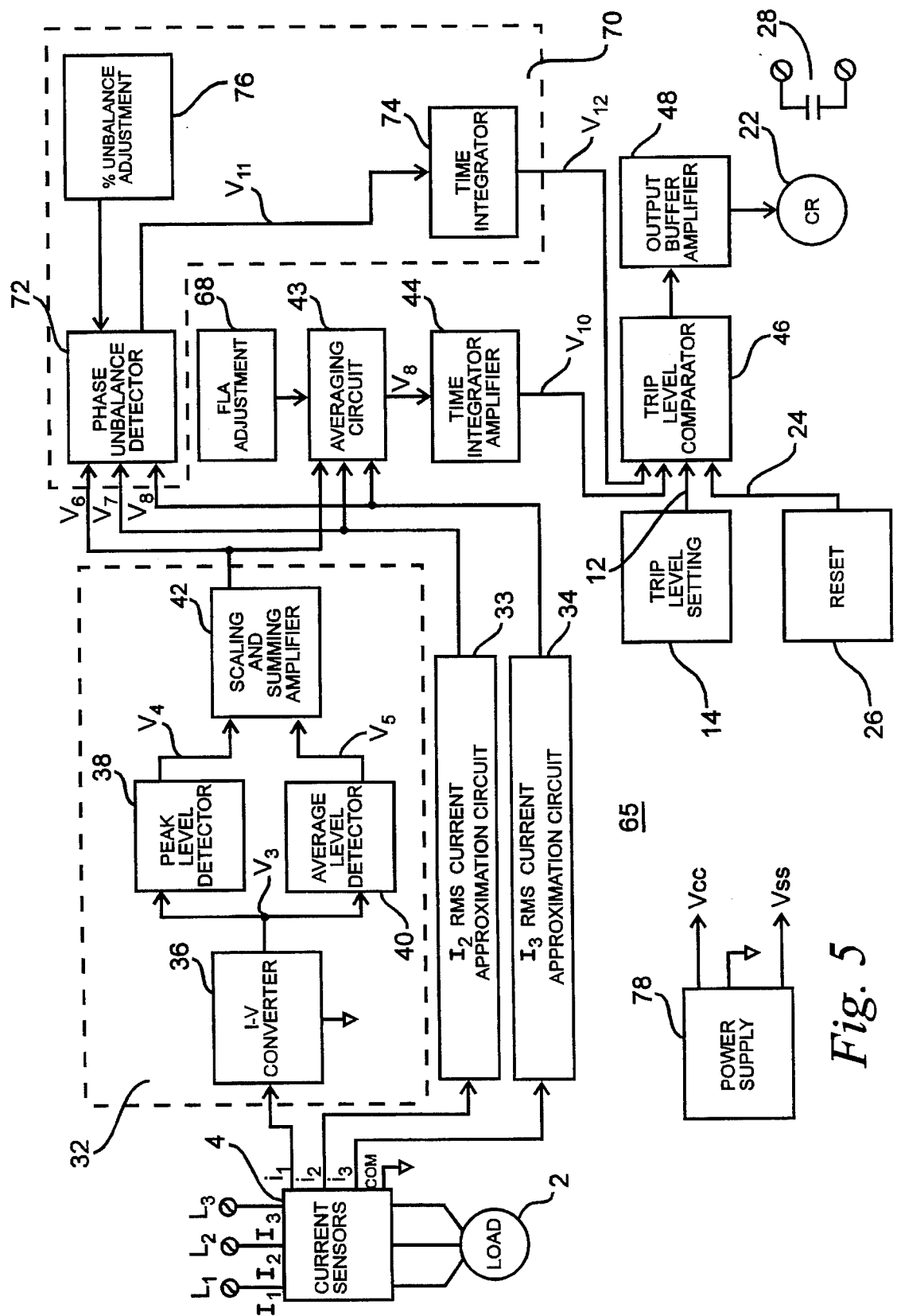
FIG. 5 is a block diagram of a SSOLR with current phase unbalance protection utilizing the system for converting the load current to an approximation of the rms value of the current according to the present invention.

Accordingly, a SSOLR 65 with current phase unbalance protection utilizing a system for converting the load current to an approximation of the rms value of the currents according to a preferred embodiment of the present invention is detailed in FIG. 5. Phase unbalance circuit 70 includes a phase unbalance detector 72 and time integrator 74 which are added to the improved SSOLR 30 as disclosed with FIG. 2. A power supply 78, not an object of the invention, generates the positive voltage VCC and negative voltage VSS necessary for the described circuits. As previously discussed, the load currents I1–I3 are independently processed by the rms current approximation circuits 32–34 to generate voltages V6–V8 which are rms approximations of the sensed line currents I1–I3. The output voltages V6–V8 are fed to an averaging circuit 43 which will combine them to create a composite DC voltage V9 proportional to the average of the three rms phase currents I1, I2, and I3. A full load amps (FLA) adjustment 68 scales the output V9 so as to allow for usage of the SSOLR 65 over a wide range of load currents. V9 is inputted to time integrator circuit 44 which, along with the trip level comparator 46, and output buffer amplifier 48 provides the timing function and output relay contacts as previously discussed for the overload relay function and is identical with the system disclosed above. The input to the phase unbalance circuit 70 are also the outputs V6–V8 from the three approximation circuits 32–34. These voltages are negative going DC voltages and are scaled and added to produce an algebraic sum of the three voltages which is then divided by three to produce an average value. This average value, which is also proportional to the average of the three rms phase currents I1, I2, and I3, is then compared with the individual voltages V6–V8 that are scaled by percent phase unbalance setting 76. A common scaling factor is 30%. Thus, if any of the signals V6–V8 exceeds the average value by 30%, the output voltage V11 of phase unbalance detector 72 will be inputted to integrator 74. Integrator 74 will output a voltage V12 for comparison with voltage 12 from the trip level setting circuit 14. Integrator 74 provides a time delay of 2 seconds or less to eliminate nuisance tripping.

Figure 6:
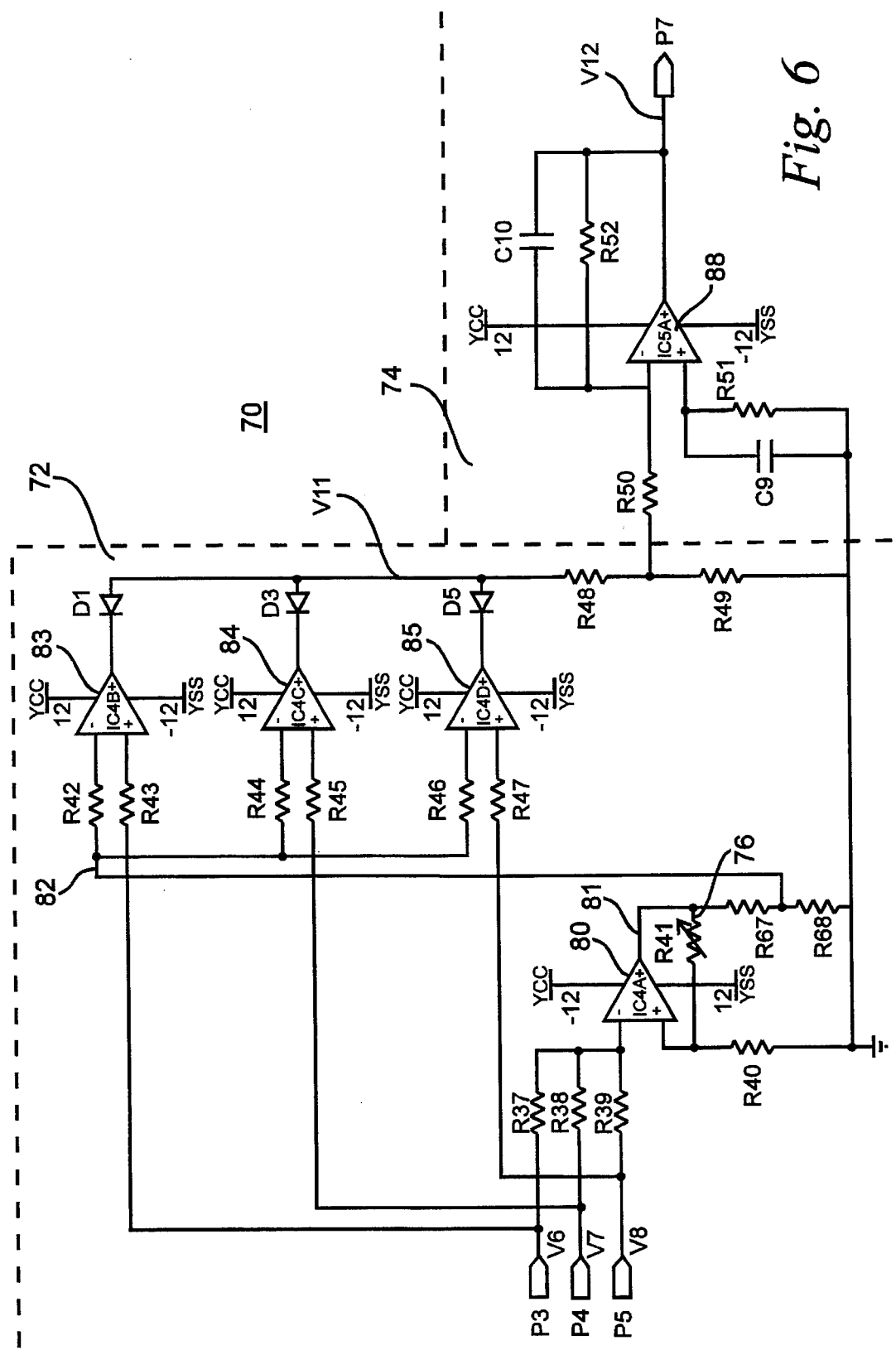
FIG. 6 is a detailed schematic diagram of a phase unbalance detector circuit utilizing the system for converting the load current to an approximation of the rms value of the current according to the present invention and as depicted in FIG. 5.

The phase unbalance detector 70 is shown in greater detail in FIG. 6. Outputs V6–V8 from the three approximation circuits 32–34 are fed into a non-inverting scaling summer 80 through resistors R37–R39. The gain of the summer 80 is determined by adjustable resistor R41 and resistor R40 which provides the percent phase unbalance setting 76. If this gain is set at 1.3 for instance, this will represent a 30% unbalance level. The output 81 of summer 80 is the algebraic sum of the scaled inputs and is fed to a potential divider R67–R68 scaled such that the junction voltage 82 will be at one third of the output voltage 81 from summer 80. This effectively takes the average of the three inputs V6–V8 and thus voltage 82 is equal to this average times the gain of the summer 80 to implement the allowable phase unbalance. Comparators 83–85 will compare this voltage 82 with each of the three phase rms current approximation voltages V6–V8, respectively. These comparators detect whether the individual voltages V6–V8 exceed the average of the these voltages by an amount greater than the percent phase unbalance setting 76. As long as voltages V6–V8 are below voltage 82, the outputs of comparators 83–85 will be positive, reverse biasing diodes D4–D6 and the output voltage V11 coupled to time integrator 74 will be effectively zero. If any of the three voltages exceed the setting 76, the corresponding comparator will switch negative and bias its corresponding diode on. This will produce a negative voltage across voltage divider R48–R49 for inputting to the integrator 74. With V11 at a negative potential, amplifier 88 will allow capacitor C10 to start charging towards the V+ positive supply voltage. The time constant of the integrator provides the time delay to avoid transient conditions from causing nuisance tripping the phase unbalance circuit. Output voltage V12 is coupled to the trip level comparator 46 for comparison with voltage 12 from the trip level setting circuit 14. If this voltage becomes greater than this setting, the device will trip out and will require a reset before the output contacts can switch back to a normal state.

Figure 7:
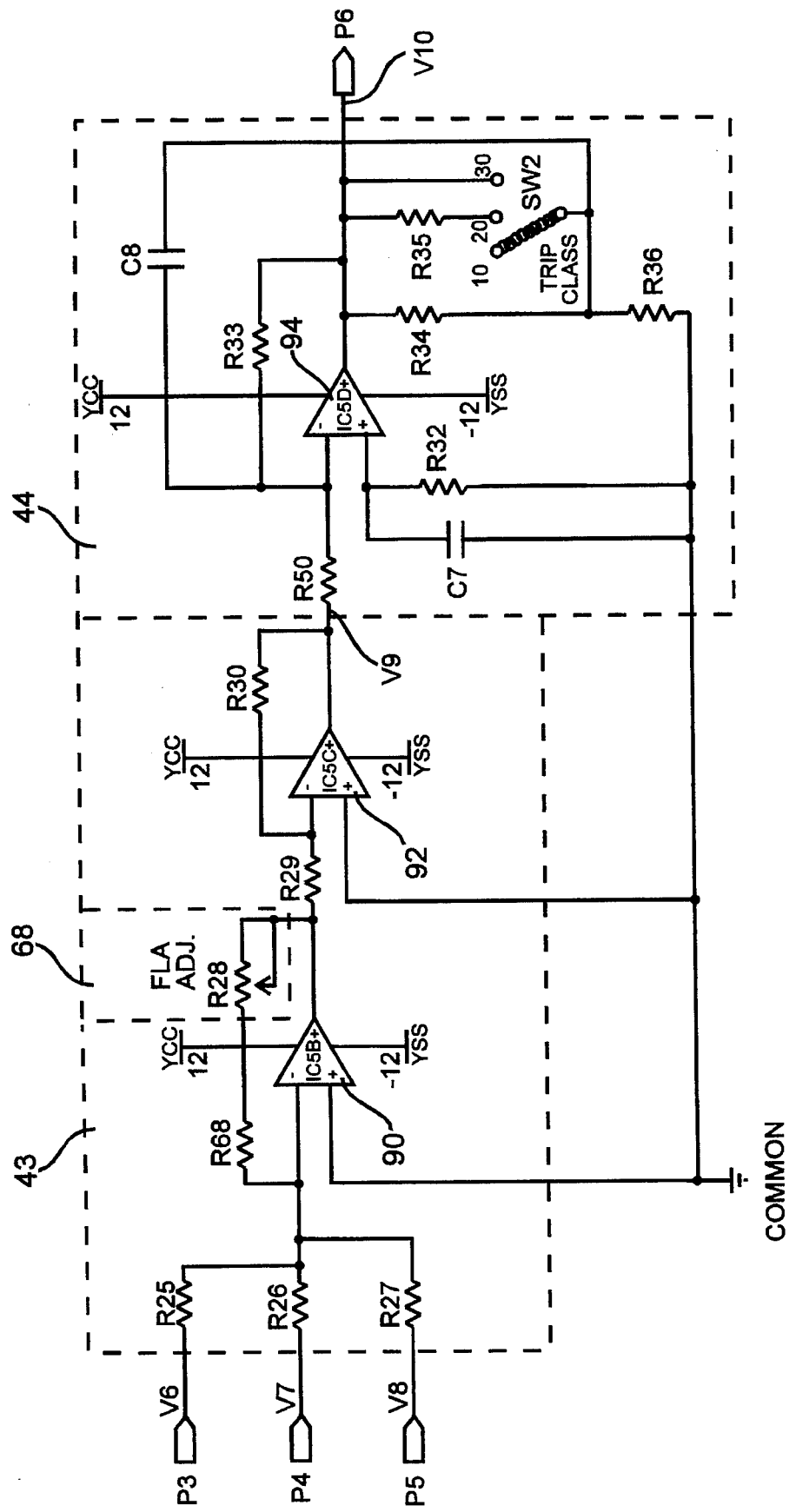
FIG. 7 is a detailed schematic diagram of a long time integrator circuit according to the present invention as depicted in FIG. 5.

The overload relay function is provided by the averaging circuit 43 and the time integrator amplifier 44 and is detailed according to the present invention as depicted in FIG. 7. Resistors R25–R27 couple the outputs V6–V8 from the three approximation circuits 32–34. These voltages are negative going DC voltages and are also scaled and added by summer 90 to produce an algebraic sum of the three voltages. The gain of summer 90 is controlled by resistor R68 and potentiometer R28 which is adjusted to accommodate different FLA or full load ampere current ratings. Amplifier 92 inverts the output of summer 90 to generate a DC negative voltage V9 for inputting to the integrator 44. Amplifier 94 generates output V10 for inputting to the trip level comparator circuit 46. Capacitor C8 will ramp towards the V+ positive supply voltage. The time constant of the integrator provides the time delay as determined by the trip class as set by switch SW2. The gain of amplifier 94 is calibrated to equal a set voltage such that when the rms approximations of the three phase currents 11–13 are at nominally 115% of FLA, the set voltage will equal the voltage level 12 as determined by the trip level setting circuit. At levels below the 115%, the voltage level will be somewhat less. The integrator circuit provides an inverse time function in addition to the trip class selection. The greater the amount of overload, the faster the integrator will reach the trip level. The trip class selection switch also allows for different trip classes. Using standard industry ratings, a trip class of 10 must cause trip of the overload within 10 seconds at an overload condition of six times FLA rating. For a class 30, this condition must occur within 30 seconds. Resistors R34 and R35 change the rate of charging capacitor C8 to change the rate of charge.

Figure 8:
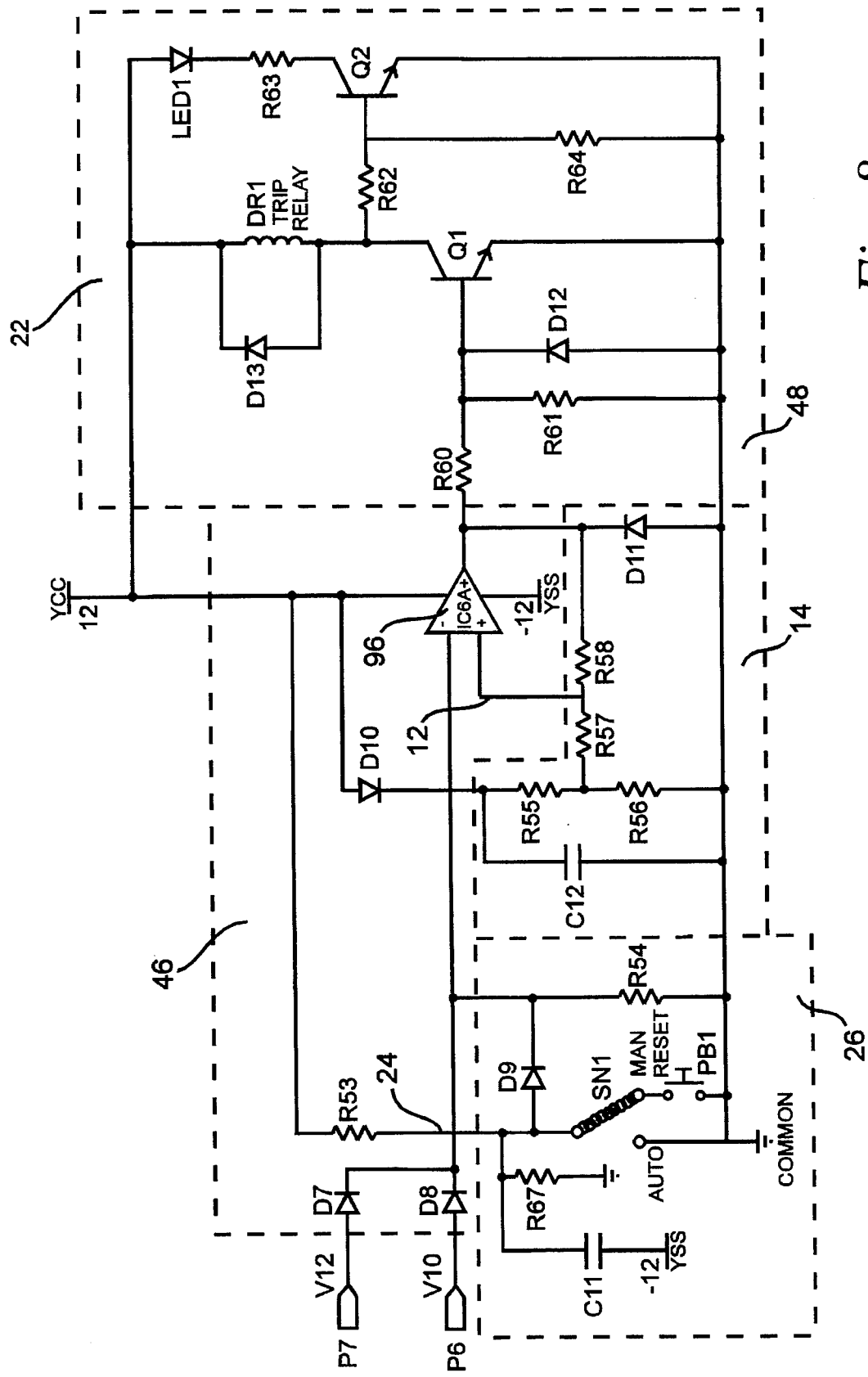
FIG. 8 is a detailed schematic diagram of a trip and reset circuit according to the present invention as depicted in FIG. 5.

FIG. 8 provides details of the trip level comparator and reset circuit according of the present invention. Schmidt trigger amplifier 96 serves as the trip level comparator 46 depicted in FIG. 5. The trip voltage 12 at the +input will be at a DC level, determined by the voltage divider from VCC to common through resistors R55 and R56, with hysteresis provided by the feedback from amplifier 96 through resistors R56–R59 in combination with R55. Under normal, untripped conditions the output of amplifier 96 will be high and this voltage will be approximately 10 volts. In the tripped mode, this level will drop to less than one volt with the output of amplifier 96 going low. Either the input voltage V10 from the overload circuits and V12 from the phase unbalance circuits coupled to the −input through diodes D8 and D7 will cause the Schmidt trigger amplifier 96 to 25 change from a high to a low state if they exceed the 10 volt level. This will turn off transistor Q1, which will deenergize relay 22 and turn on Q2 for providing a visual indication of a trip by LED1. The overload relay function generally requires a device to drop out rather than pickup when the trip occurs. Thus relay 22 is normally energized and drops out for a trip condition. Once a trip occurs, voltage from the reset circuit 26 will maintain a voltage 24 through diode D9 at the −input that is higher than voltage 12 at the +input. If switch SW1 is in the AUTO position, reset will occur automatically when voltages V10 and V12 decay below voltage 12. In the MAN position, reset will occur when voltages V10 and V12 decay below voltage 12 and push-button PB1 is depressed.

While the specific embodiments have been illustrated and described, numerous modifications are possible without departing from the scope or spirit of the invention. It is readily apparent that all of the electronic circuitry is adaptable for integration as an ASIC chip. Although in the foregoing embodiments have been applied to a three phase system, it will be clearly understood that the invention is equally applicable to polyphase systems, with the requirement being the addition or subtraction of a separate rms approximation circuit for each phase of the voltage source, adjustments in the time constants of the resistor-capacitor combinations in the peak level detecting and average level detecting circuits, and changes in the averaging circuit that combines the outputs of the rms approximation circuits.

I claim:

1. An apparatus for detecting AC current line unbalance between phases of a polyphase AC source supplying power to a load comprising:

a. a current sensor in each phase to sense actual current supplied to said load from said polyphase AC source;

b. an approximation circuit in each phase including a converter to convert said actual current to a first voltage proportional to said actual current and a first amplifier to generate a second voltage from said first voltage, said second voltage proportional to an approximate value equal to the rms current in said phase supplied to said load;

c. an averaging circuit to sum said second voltage from each phase and to determine an average value that is an average of the second voltage of all said phases, said average value approximately equal to an average rms current in each phase of said polyphase AC source, said averaging circuit including means to scale said average value by a predetermined factor representative of an allowable level of phase current unbalance between each phase of said polyphase AC source, said averaging circuit to generate a third voltage level, said third voltage level proportional to said allowable level of phase current unbalance;

d. a comparator in each phase to compare said third voltage level with said second voltage proportional to the approximate rms current of said phase, said comparator to output a signal to indicate a phase current unbalance condition if said second voltage exceeds said third voltage scaled algebraic sum; and e. a time integrator to receive said output signal from said comparator in each phase of said polyphase AC source, and said time integrator to output a trip signal to indicate an unbalance condition if any of said output signals is present for a predetermined time period.

2. The apparatus for detecting AC current line unbalance between phases of a polyphase AC source of claim 1 wherein said approximation circuit in each phase includes first means to generate a voltage from said first voltage proportionally equivalent to an average value of said actual current, second means to generate a voltage from said first voltage proportionally equivalent to a peak value of said actual current, and third means to sum a fraction of said voltage from said first means with a fraction of said voltage from said second means to provide said second voltage proportional to the rms current of said load.

3. The apparatus for detecting AC current line unbalance between phases of a polyphase AC source of claim 2 wherein said approximation circuit solves an approximation equation to provide said output signal proportional to the rms current of said load, said approximation equation is equivalent to the equation $$I_{rms}=(0.22*I_{pk})+(0.776*I_{ave})$$

wherein $I_{rms}$ is the rms current of said load, $I_{pk}$ is the peak current of said load, and $I_{ave}$ is the average current of said load.

4. The apparatus for detecting AC current line unbalance between phases of a polyphase AC source of claim 1 wherein said polyphase AC source is a three phase AC source.

5. The apparatus for detecting AC current line unbalance between phases of a polyphase AC source of claim 1 wherein said averaging circuit comprises an operational amplifier having an adjustable resistor in a feedback path between the amplifier output and its inverting input, said resistor for determining gain of the amplifier, said gain to scale said average value by said predetermined factor representative of an allowable level of phase current unbalance between each phase of said polyphase AC source.

6. The apparatus for detecting AC current line unbalance between phases of a polyphase AC source of claim 5 wherein said averaging circuit further includes a voltage divider between an output of said operational amplifier and circuit common, said voltage divider comprising two series connected resistors having a resistance ratio of 2:1 for a three phase AC source, and whereby said output of said voltage divider is equal to ⅓ of the sum of said second voltage from each phase, said output is thereby proportionately equal to the average rms current in each phase of said three phase AC source.

7. An overload relay with phase current unbalance detection for a polyphase electrical source providing polyphase currents to a load, said overload relay having a trip indication when either an overload condition exists or when one of said polyphase currents exceeds a predetermined percentage of an average of said polyphase currents, said overload relay comprising:

a. means to convert each of said polyphase currents supplied to said load from said electrical source to a voltage proportional to said phase current for each of said polyphase currents;

b. means to approximate an rms current equivalent of said phase current from said voltage proportional to said phase current to generate a DC voltage proportional to said rms current for each of said polyphase currents;

c. means to generate an algebraic sum of said DC voltages proportional to said rms current for each of said polyphase currents;

d. means to integrate over time said algebraic sum to generate a trip voltage level, said trip voltage level representative of a composite rms current of polyphase currents;

e. means to compare said trip voltage level with a preset voltage level representing an overload trip setting, said comparison means to indicate an overload condition if said trip voltage level is greater than said preset voltage level;

f. means to generate an average DC voltage from said algebraic sum, said average DC voltage equivalent to said average rms current of said polyphase currents;

g. means to scale said algebraic sum by a predetermined factor representative of an allowable level of phase unbalance; and h. means to compare said scaled algebraic sum with each of said DC voltages proportional to said rms current for each of said polyphase currents, said comparison means to indicate a phase current unbalance condition if any of said DC voltages for each of said polyphase currents exceeds said scaled algebraic sum.

8. The overload relay with phase current unbalance detection of claim 7 wherein said approximation means of the rms current equivalent of each of said polyphase currents comprises means to generate a first voltage equivalent to an average value of said phase current, means to generate a second voltage equivalent to a peak value of said phase current, and means to sum a fraction of said first voltage with a fraction of said second voltage to provide said DC voltage proportional to said rms current for each of said polyphase currents.

9. The overload relay with phase current unbalance detection of claim 8 wherein said summing means solves an approximation equation to provide said DC voltage proportional to the said rms current for each of said polyphase currents.

10. The overload relay with phase current unbalance detection of claim 9 wherein said approximation equation is equivalent to the equation $$I_{rms}=(0.22*I_{pk})+(0.776*I_{ave})$$

wherein $I_{rms}$ is the rms current of said load, $I_{pk}$ is the peak current of said load, and $I_{ave}$ is the average current of said load.

11. The overload relay with phase current unbalance detection of claim 8 wherein said integration means includes means for selecting a trip class, said trip class to determine a trip time by changing a time constant of said integration means.

12. The overload relay with phase current unbalance detection of claim 8 wherein said generation means of said algebraic sum includes means for setting a full load ampere rating of said overload relay, said rating to determine when said overload condition exists.

13. A protective apparatus for controllably interrupting power supplied to an AC load from a polyphase AC source through a switching device, in response to a trip signal, by monitoring phase current in each phase of the polyphase AC source, said protective apparatus comprising:

a. approximating means for determining the rms equivalent current of each phase current and generating a proportional voltage level, said voltage level proportional to said rms equivalent current for each phase of the polyphase AC source;

b. averaging means for determining an average rms current that is an average of the rms equivalent currents of all of said phase currents, said averaging means further having means for multiplying said average rms current by a factor representing a percentage of allowable current unbalance in each of said phase currents to generate a scaled trip voltage level;

c. first comparator means for each phase of said polyphase AC source, each of said comparator means having one input coupled to said scaled trip voltage level and another input coupled to said respective proportional voltage level, said comparator means for producing an unbalance signal in response to said proportional voltage level being greater than said scaled trip voltage level;

d. time integration means for producing a pretrip signal, said pretrip signal increasing in magnitude in response to said unbalance signal from at least one first comparator means;

e. second comparator means for comparing said pretrip signal with a predetermined level and for producing said trip signal if said unbalance signal is present for a predetermined time period.

14. The protective apparatus of claim 13 wherein said approximating means includes means to sense actual current in each phase of said polyphase AC source and means to convert said actual current in each phase to a first voltage proportional to said actual current.

15. The protective apparatus of claim 14 wherein said approximating means further includes means to generate a second voltage from said first voltage, said second voltage equivalent to an average value of said phase current, means to generate a third voltage from said first voltage said third voltage equivalent to a peak value of said phase current, and means to sum a fraction of said second voltage with a fraction of said third voltage to provide said voltage level proportional to said rms equivalent current for each phase of the polyphase AC source.

16. The protective apparatus of claim 15 wherein said approximating means solves an approximation equation to provide said proportional voltage level to said rms equivalent current for each phase of the polyphase AC source, said approximation equation is equivalent to the equation $$I_{rms}=(0.22*I_{pk})+(0.776*I_{ave})$$

wherein $I_{rms}$ is the rms current of said load, $I_{pk}$ is the peak current of said load, and $I_{ave}$ is the average current of said load.

17. The protective apparatus of claim 15 wherein said averaging means includes an operational amplifier having an adjustable resistor in a feedback path between the amplifier output and its inverting input, said resistor for determining gain of the amplifier, said gain to scale said average value of said phase current by said factor representative of an allowable level of phase current unbalance between each phase of said polyphase AC source.

18. The protective apparatus of claim 17 wherein said averaging means further includes a voltage divider between an output of said operational amplifier and circuit common, said voltage divider comprising two series connected resistors having a resistance ratio of 2:1 for a three phase AC source, and whereby said output of said voltage divider is equal to ⅓ of the sum of said second voltage from each phase, said output is thereby proportionately equal to the average rms current in each phase of said three phase AC source.

19. The protective apparatus of claim 13 wherein said polyphase AC source is a three phase AC source.

\* \* \* \* \*